United States Patent
Nishiguchi et al.

(10) Patent No.: US 10,850,557 B2
(45) Date of Patent: Dec. 1, 2020

(54) WHEEL FOR UTILITY VEHICLE

(71) Applicant: KAWASAKI JUKOGYO KABUSHIKI KAISHA, Hyogo (JP)

(72) Inventors: Nobuyuki Nishiguchi, Foothill Ranch, CA (US); Joe Heim, Orange County, CA (US)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 328 days.

(21) Appl. No.: 15/982,348

(22) Filed: May 17, 2018

(65) Prior Publication Data
US 2019/0351704 A1    Nov. 21, 2019

(51) Int. Cl.
*B60B 3/14*    (2006.01)
*B60B 3/00*    (2006.01)

(52) U.S. Cl.
CPC ............... *B60B 3/14* (2013.01); *B60B 3/008* (2013.01); *B60B 3/147* (2013.01); *B60Y 2200/124* (2013.01)

(58) Field of Classification Search
CPC .. B60B 1/08; B60B 3/00; B60B 3/008; B60B 3/02; B60B 3/06; B60B 3/10; B60B 3/14; B60B 3/147; B60B 3/16
See application file for complete search history.

(56) References Cited

U.S. PATENT DOCUMENTS

| | | | | |
|---|---|---|---|---|
| 1,364,327 A * | 1/1921 | Slaymaker | ................. | B60B 3/14 301/63.109 |
| 1,461,229 A * | 7/1923 | Slaymaker | ................. | B60B 3/04 301/35.629 |
| 1,500,333 A * | 7/1924 | Putnam | ..................... | B60B 3/16 301/35.629 |
| 2,100,654 A * | 11/1937 | Swain | ..................... | B60B 23/12 301/12.1 |
| RE21,960 E * | 11/1941 | Stough | .................... | B60B 3/002 301/35.626 |
| 2,267,980 A * | 12/1941 | Jones | ..................... | B60B 23/12 301/20 |
| 2,291,156 A * | 7/1942 | Heesch | ................... | B60B 23/12 301/35.621 |
| 2,407,749 A * | 9/1946 | Sinclair | .................... | B60B 3/16 301/35.626 |
| 2,410,579 A * | 11/1946 | Haag | ........................ | B60B 23/10 301/35.632 |

(Continued)

FOREIGN PATENT DOCUMENTS

JP       2009-23587      2/2009

*Primary Examiner* — Jason R Bellinger
(74) *Attorney, Agent, or Firm* — Wenderoth, Lind & Ponack, L.L.P.

(57) ABSTRACT

A wheel for a utility vehicle includes a first attaching face with which the wheel is to be attached to a hub of a vehicle body, and a second attaching face with which the wheel inversed in a vehicle width direction is to be attached to the hub. The wheel is structured such that the first attaching face is, when attached to the hub, offset outward in the vehicle width direction with respect to a center line in the vehicle width direction of the wheel, and the second attaching face is, when attached to the hub, offset inward in the vehicle width direction with respect to the center line in the vehicle width direction of the wheel.

4 Claims, 10 Drawing Sheets

(56) References Cited

U.S. PATENT DOCUMENTS

| | | | | |
|---|---|---|---|---|
| 2,424,106 A | * | 7/1947 | Martens | B60B 3/16 |
| | | | | 301/35.626 |
| 3,869,174 A | * | 3/1975 | Brown | B60B 3/14 |
| | | | | 301/35.629 |
| 3,871,708 A | * | 3/1975 | Richter | B60B 3/14 |
| | | | | 301/35.629 |
| 5,362,134 A | * | 11/1994 | Carmona | B60B 3/008 |
| | | | | 301/105.1 |
| 2006/0152067 A1 | * | 7/2006 | Corte | B60B 3/008 |
| | | | | 301/35.631 |
| 2008/0054714 A1 | * | 3/2008 | Morrow | B60B 23/12 |
| | | | | 301/63.101 |

\* cited by examiner

WHEEL FOR UTILITY VEHICLE

BACKGROUND OF THE INVENTION

1. Field of the Invention

The present invention relates to a wheel structured for a utility vehicle.

2. Description of the Related Art

Conventional utility vehicles are used in various purposes including leisure and working purposes. To use a utility vehicle as a working vehicle, such as a tractor, as shown in JP 2009-23587 A, for example, a tread width has been changed.

SUMMARY OF THE INVENTION

For example, to drive a utility vehicle on muddy areas or sand dune, a tread width of the vehicle needs to be increased for stable travelling, while, to drive the utility vehicle on narrower areas including mountain and forest roads, the tread width of the vehicle needs to be reduced so as to easily avoid obstructions.

To respond to such various purposes, a utility vehicle needs to be provided with a plurality of types of wheels to change a tread width of the vehicle.

In view of the above-described demand, the present invention has an object to provide a wheel for a utility vehicle, which is structured so that a tread width of the vehicle can be changed.

To achieve the above-described object, the present invention is a wheel for a utility vehicle, including a first attaching face with which the wheel is to be attached to a hub of a vehicle body, and a second attaching face with which the wheel inversed in a vehicle width direction is to be attached to the hub, where the wheel is structured such that the first attaching face is, when attached to the hub, offset outward in the vehicle width direction with respect to a center line in the vehicle width direction of the wheel, and the second attaching face is, when attached to the hub, offset inward in the vehicle width direction with respect to the center line of the vehicle width direction of the wheel.

With a single type of the wheel including the two attaching faces (first attaching face and second attaching face), a tread width of a vehicle can be changed with a plurality of the wheels by respectively changing one of the attaching faces used for attachment to a hub to another.

It is preferable that the wheel for a utility vehicle, which is structured according to the present invention, further include the following configurations.

(1) In a first attached state in which the first attaching face is used for attachment, an outer end in the vehicle width direction of the wheel lies inside in the vehicle width direction with respect to an outer end in the vehicle width direction of a frame of the vehicle body when viewed in a longitudinal direction, and, in a second attached state in which the second attaching face is used for attachment, an outer end in the vehicle width direction of the wheel lies outside in the vehicle width direction with respect to the outer end in the vehicle width direction of the frame of the vehicle body when viewed in the longitudinal direction.

(2) The first attaching face is to be attached to the hub via a spacer, and the second attaching face is to be attached to the hub via a spacer.

(3) First hub bolt attaching holes formed on the first attaching face and second hub bolt attaching holes formed on the second attaching face do not respectively align to each other.

With the configuration described in (1), a vehicle width of a vehicle can be changed with a single type of the wheel by changing one of the attaching faces used for attachment to the hub to another.

With the configuration described in (2), a tread width can be finely adjusted with spacers.

With the configuration described in (3), the first attaching face and the second attaching face can be prevented from being confused, and accordingly the wheels can each be prevented from being attached incorrectly.

In other words, the present invention is capable of providing a wheel for a utility vehicle, which is structured so that a tread width of the vehicle can be changed.

DETAILED DESCRIPTION OF THE INVENTION

A utility vehicle equipped with wheels each structured according to one embodiment of the present invention will now be described herein with reference to the accompanying drawings. The utility vehicle is a vehicle for off-road traveling which travels not only on a grass field, a gravel field and a sandy field but also on an unpaved mountain road, a forest road, a muddy road, a rocky area or the like. For the sake of convenience of the description, an advancing direction of the utility vehicle is assumed as a "front side" of the utility vehicle and respective parts, and right and left sides in a vehicle width direction when an occupant riding on the utility vehicle faces forward are assumed as "right and left sides" of the utility vehicle and the respective parts.

[Entire Structure of Vehicle]

Figure 1:
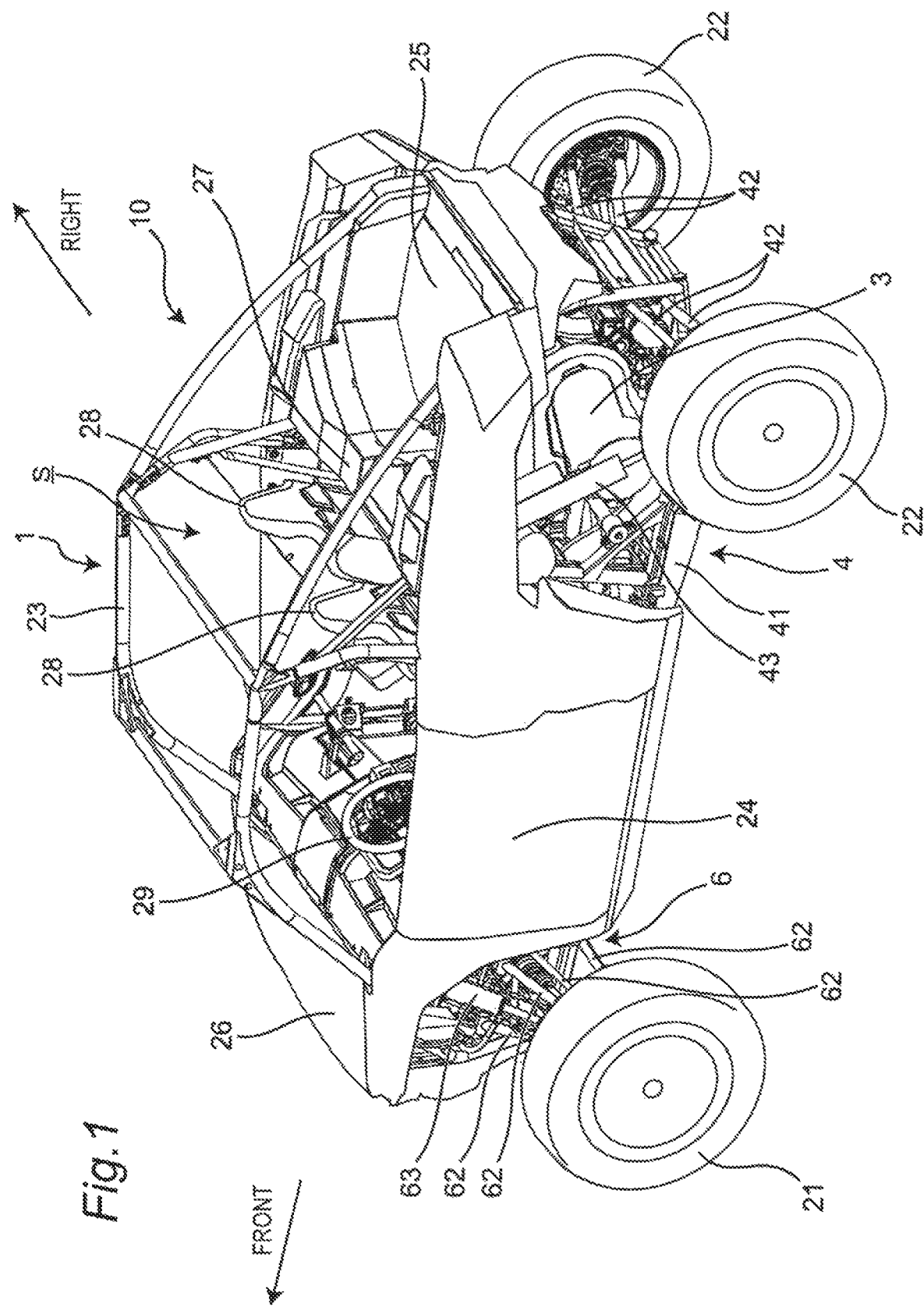
FIG. 1 is a perspective view of a utility vehicle equipped with wheels each structured according to one embodiment of the present invention.
Figure 2:
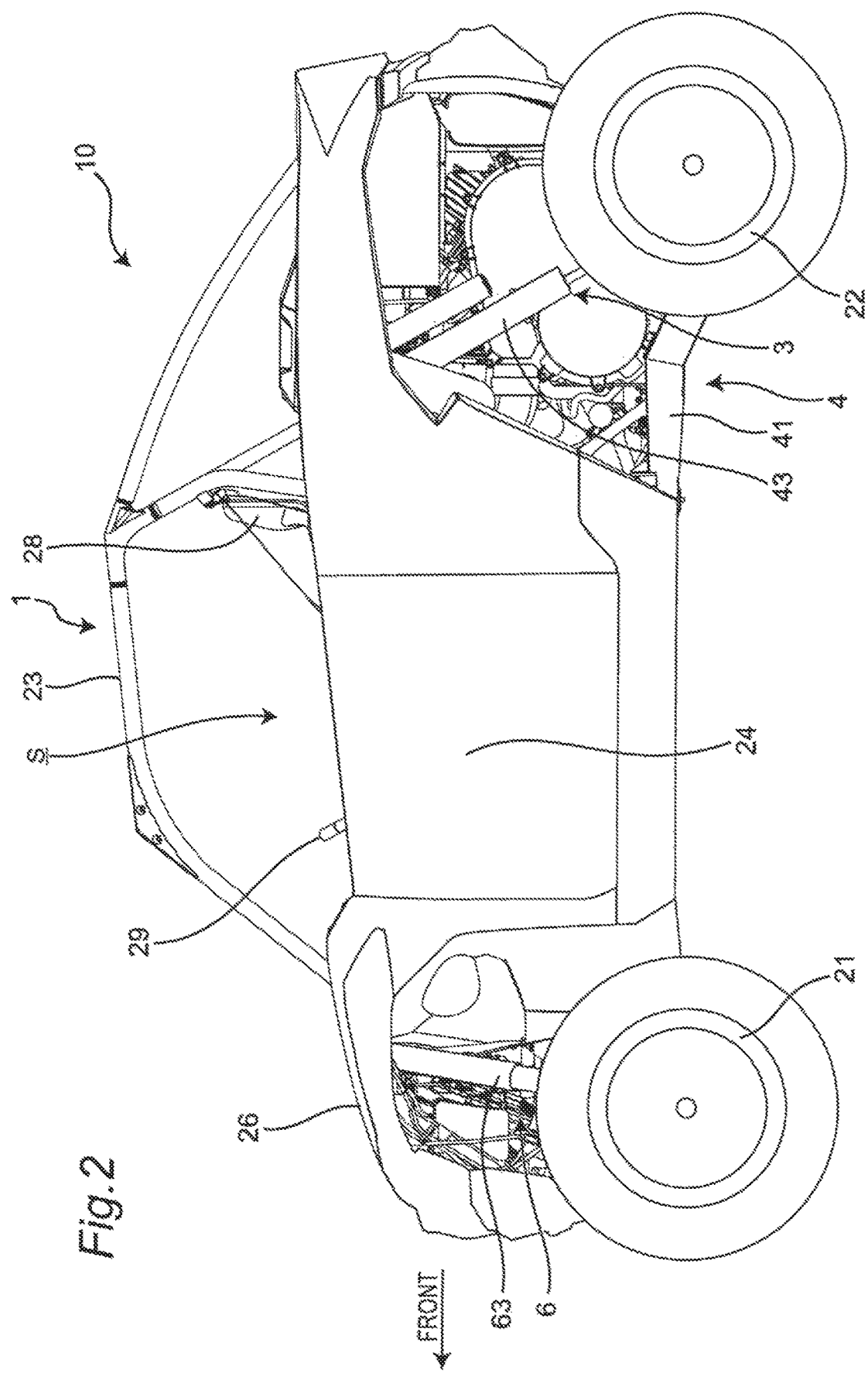
FIG. 2 is a left side view of the utility vehicle shown in FIG. 1.

FIG. 1 is a perspective view of a utility vehicle equipped with wheels each structured according to one embodiment of the present invention, and FIG. 2 is a left side view of the utility vehicle shown in FIG. 1.

As shown in FIGS. 1 and 2, a utility vehicle 10 includes a pair of right and left front wheels 21 on a front portion of a vehicle body and a pair of right and left rear wheels 22 on a rear portion of the vehicle body. The utility vehicle 10 includes a riding space (cabin) S between the front wheels 21 and the rear wheels 22. The riding space S is surrounded by a ROPS 23, and a pair of right and left doors 24. The ROPS is an abbreviation of "rollover protective structure", and is a part of a vehicle body frame 1.

A cargo bed 25 is disposed behind the riding space S, and a bonnet 26 is disposed in front of the riding space S. A back panel 27 which partitions the cargo bed 25 and the riding space S from each other is mounted on a front end of the cargo bed 25.

A pair of right and left independent-type seats 28 is disposed in the inside of the riding space S. An operating part such as a steering wheel 29 is disposed in front of the seat 28.

A power unit 3 is disposed below the cargo bed 25. The power unit 3 includes an engine and a transmission. A driving force of the engine is transmitted to the transmission, and the transmission transmits the driving force to the pair of right and left front wheels 21 and the pair of right and left rear wheels 22.

Figure 3:
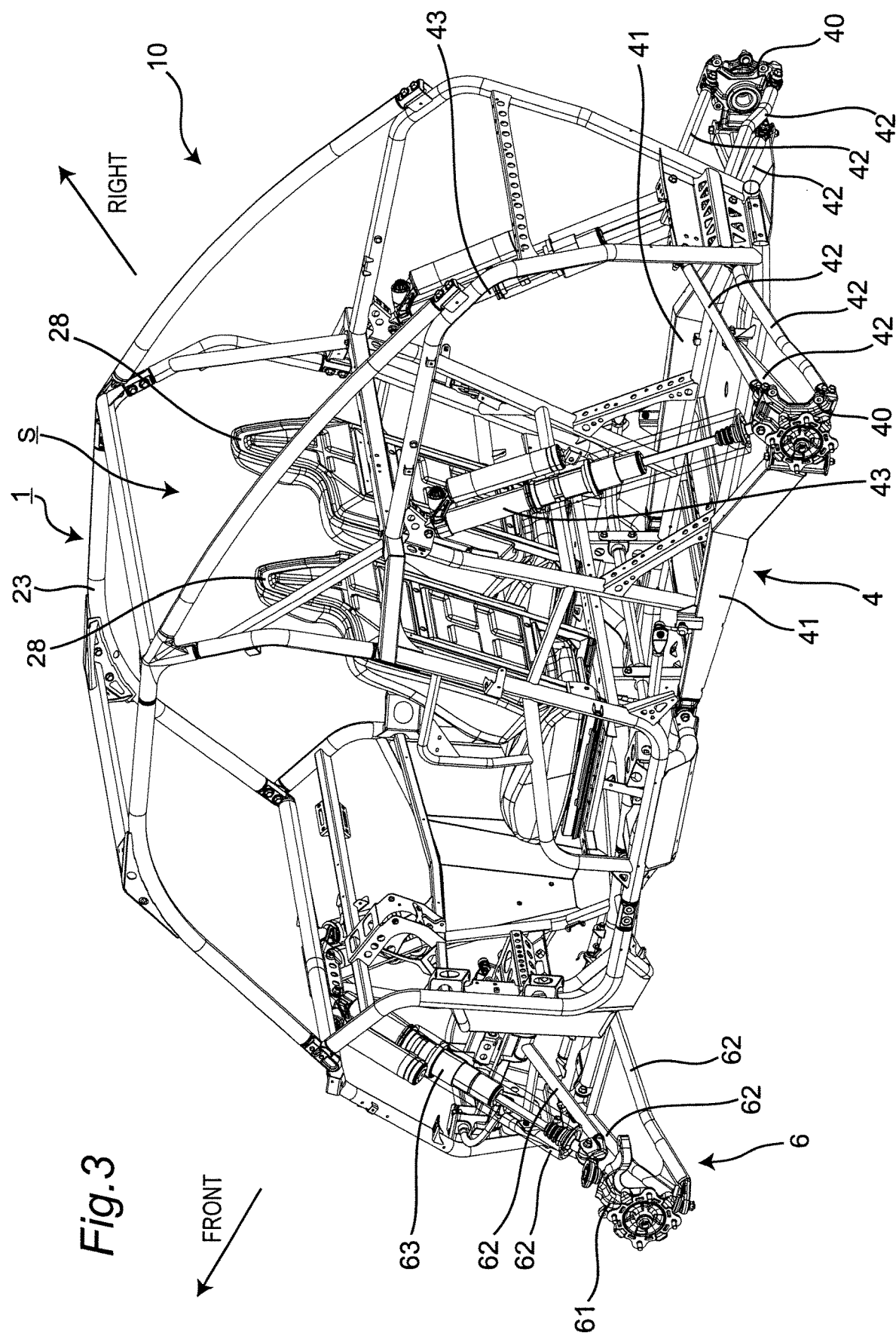
FIG. 3 is a perspective view of the utility vehicle, showing support structures for front and rear wheels.

FIG. 3 is a perspective view of the utility vehicle, showing support structures for the front wheels 21 and the rear wheels 22. As shown in FIG. 3, a pair of right and left independent-suspension-type rear wheel-use suspension devices 4 which supports the pair of right and left rear wheels 22 in a vertically swingable manner is disposed below the cargo bed 25 and on both sides of the power unit 3. Each suspension device 4 includes: a knuckle 40 which supports a hub for the rear wheel 22 in a rotatable manner; a trailing arm 41 which has a front end thereof supported on the vehicle body frame 1 and extends in a longitudinal direction; a plurality of control rods 42 which extend in the vehicle width direction and support a rear end of the trailing arm 41 on the vehicle body frame 1; and a shock absorber 43 which elastically supports the trailing arm 41 on the vehicle body frame 1.

A pair of right and left independent-suspension-type front-wheel-use suspension devices 6 which supports the pair of right and left front wheels 21 in a vertically swingable manner is disposed below the bonnet 26 and on both sides of a front-wheel-use final reduction gear (not shown in the drawing) which transmits a driving force to the front wheels 21. Each suspension device 6 includes: a knuckle 61 which supports a hub for the front wheel 21 in a rotatable manner; a plurality of control rods 62 which extend in the vehicle width direction and support the knuckle 61 on the vehicle body frame 1; and a shock absorber 63 which elastically supports the control rods 62 on the vehicle body frame 1.

[Wheel Structure]

Figure 4:
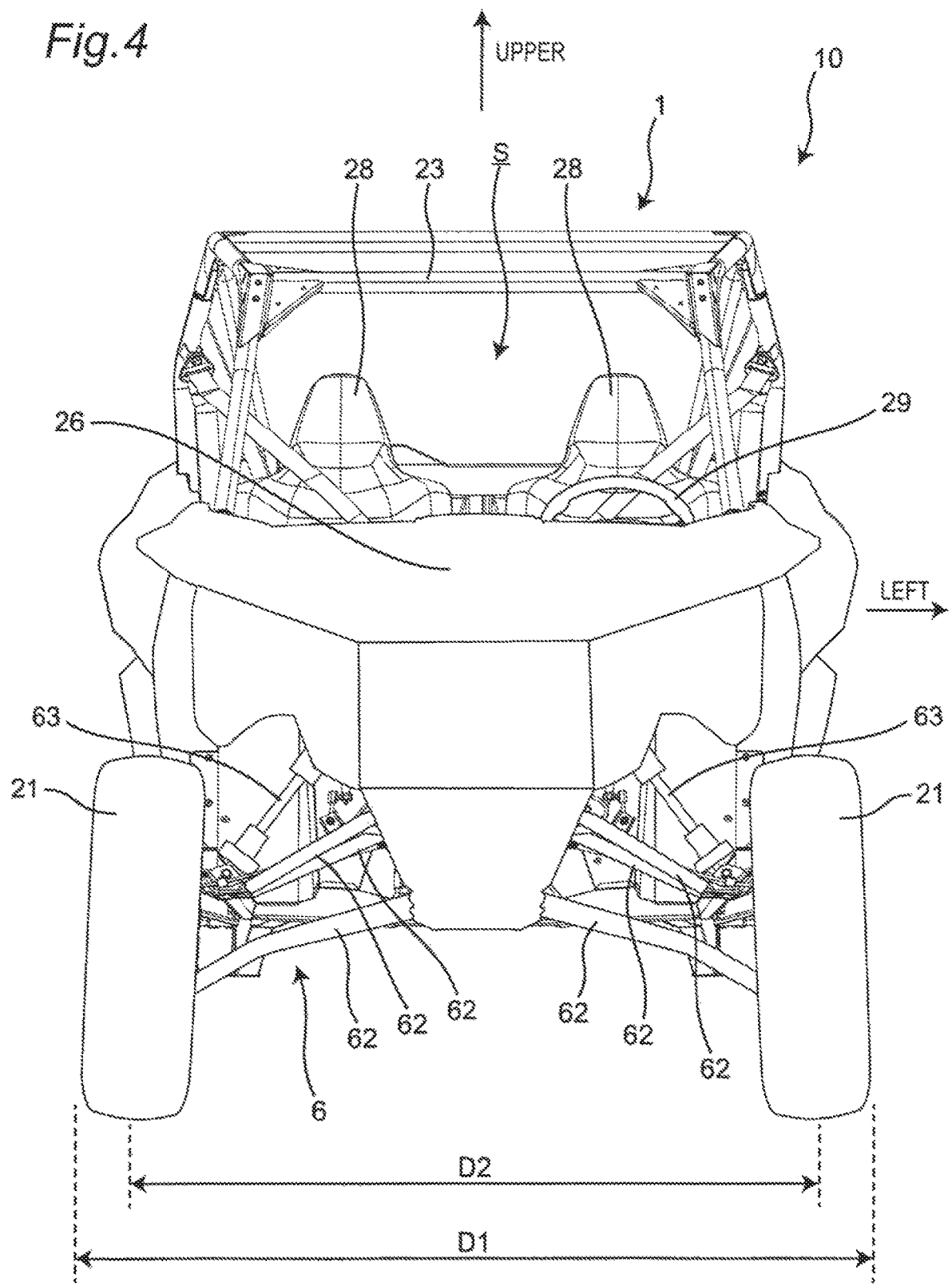
FIG. 4 is a front view of the utility vehicle shown in FIG. 1.
Figure 5:
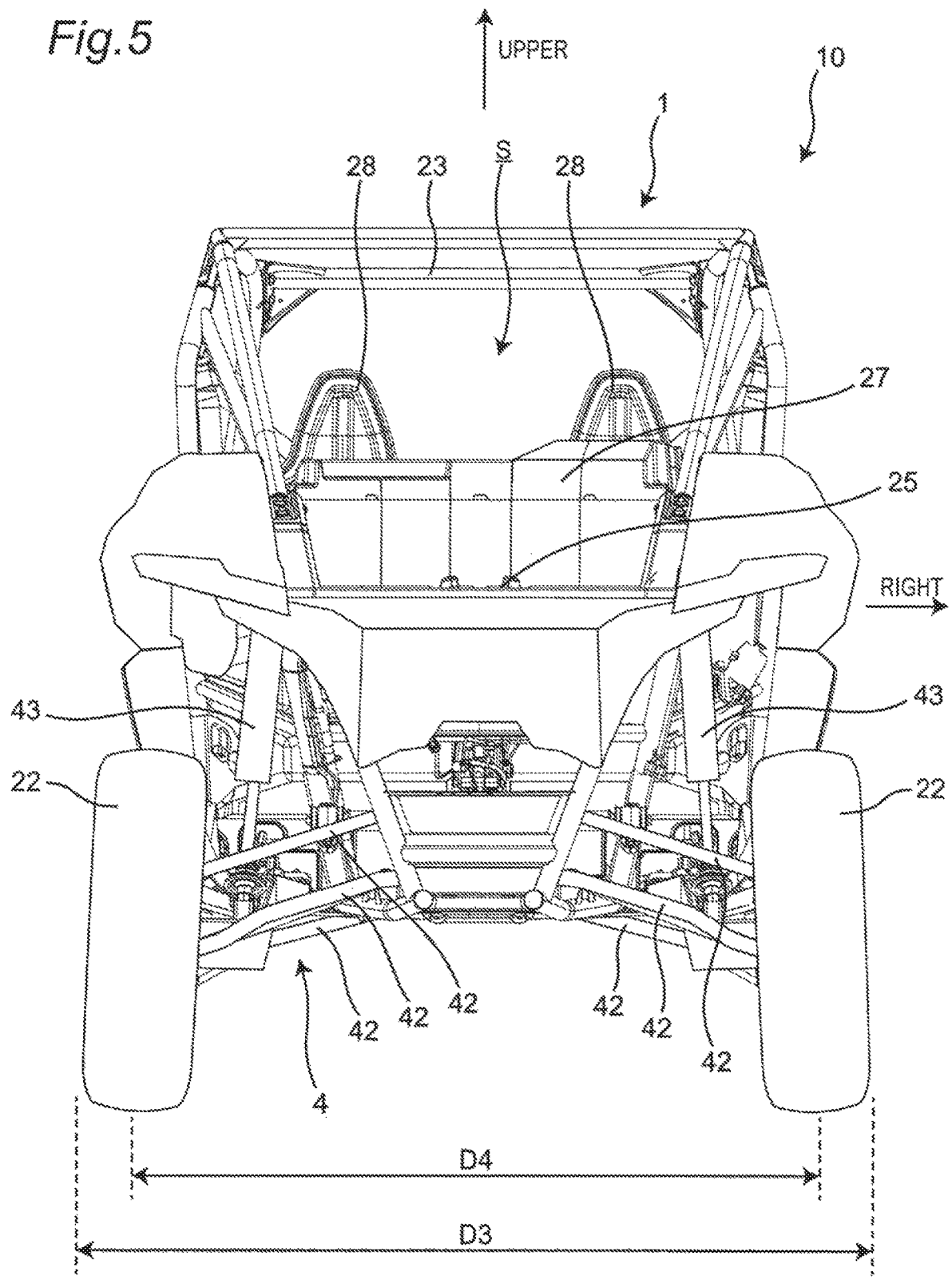
FIG. 5 is a rear view of the utility vehicle shown in FIG. 1.

FIG. 4 is a front view of the utility vehicle shown in FIG. 1, and FIG. 5 is a rear view of the utility vehicle shown in FIG. 1. As shown in FIGS. 4 and 5, a vehicle width (total width) of the utility vehicle 10 is defined by a longest portion in the vehicle width direction of the vehicle, and, in the states shown in FIGS. 4 and 5, the vehicle width is defined by a distance D1 between outer ends in the vehicle width direction of the front wheels 21 and a distance D3 between outer ends in the vehicle width direction of the rear wheels 22. In here, the distance D1 between the outer ends in the vehicle width direction of the front wheels 21 and the distance D3 between the outer ends in the vehicle width direction of the rear wheels 22 are identical to each other. A tread width D2 between the front wheels 21 is defined by a distance between centers in the vehicle width direction of the front wheels 21, and a tread width D4 between the rear wheels 22 is defined by a distance between centers in the vehicle width direction of the rear wheels 22. In the embodiment, the tread width D2 between the front wheels 21 and the tread width D3 between the rear wheels 22 are identical to each other. A wheel structured according to the present invention can be applied to the front wheels 21 and/or the rear wheels 22. One of the front wheels 21 will now be exemplified herein.

Figure 6:
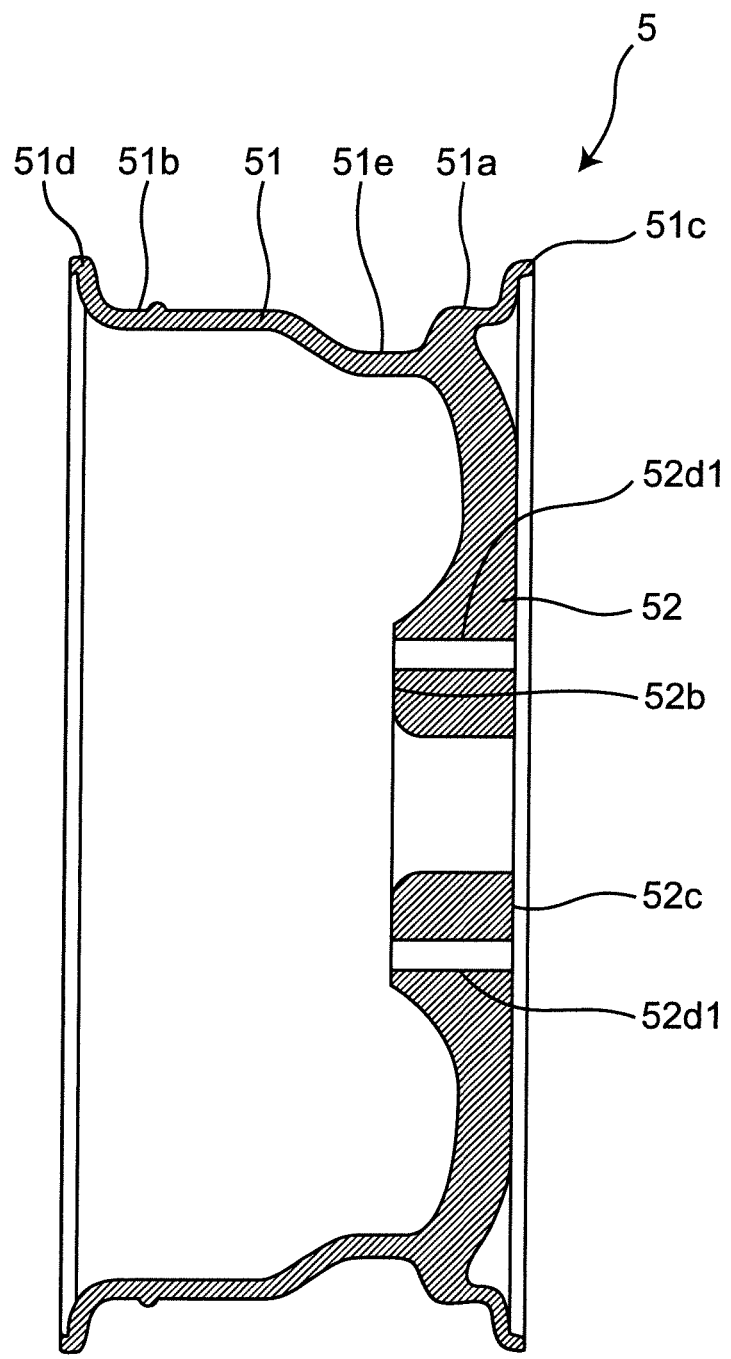
FIG. 6 is a schematic front view of a wheel of a front wheel.
Figure 7:
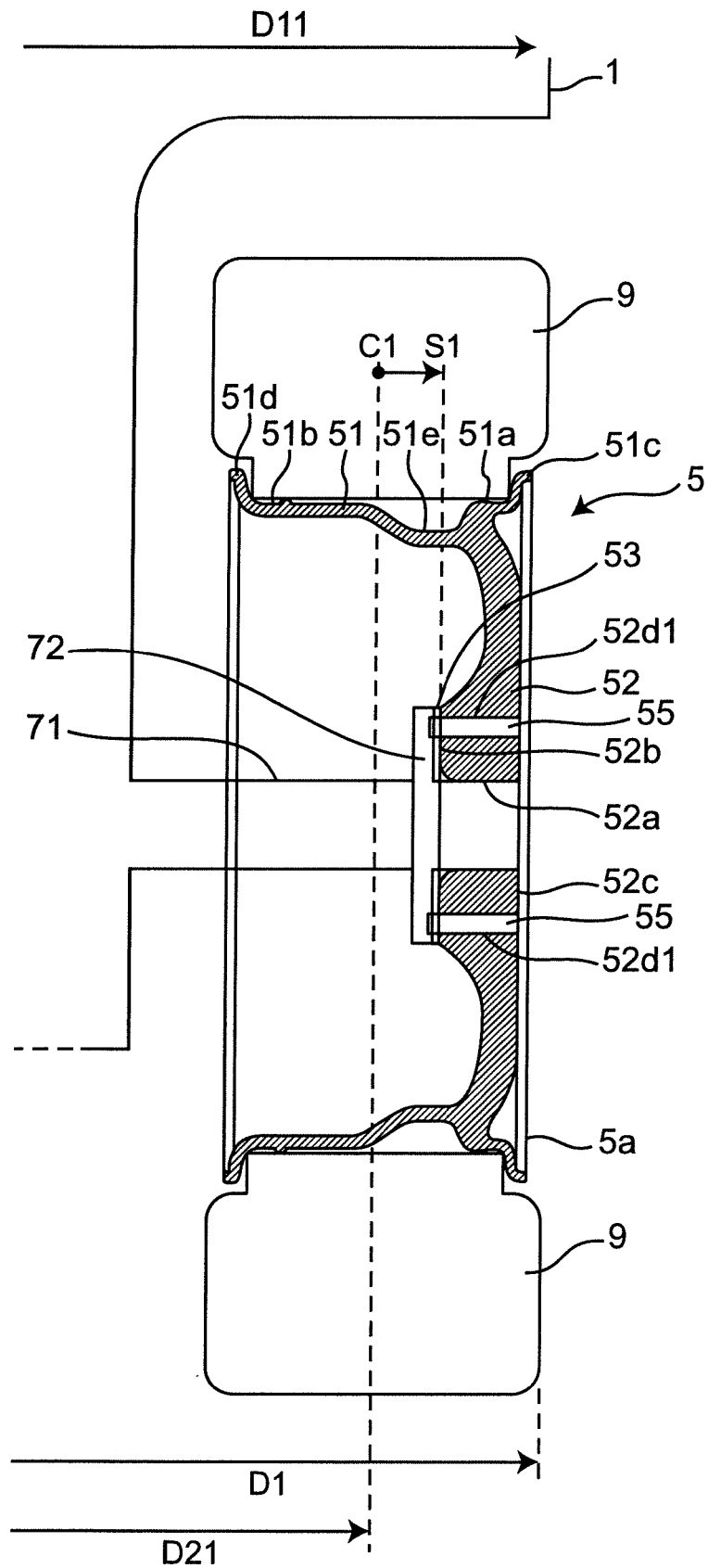
FIG. 7 is a schematic front view when a hub on an axle is attached to a first attaching face of the wheel.

FIG. 6 is a schematic front view of a wheel 5 used for each of the front wheels 21, and FIG. 7 is a schematic front view of the wheel 5 attached to a hub 72 on an axle 71 of a vehicle body. As shown in FIGS. 6 and 7, the wheel 5 is configured to be attached with a tire 9. The wheel 5 is made of a light alloy material, such as aluminum and magnesium, and includes a rim 51 to which the tire 9 is to be attached, and a disc 52 used to couple the rim 51 to the hub 72. The rim 51 and the disc 52 are integrally formed through forging, for example.

The rim 51 is formed in an annular shape about the axle 71, and has, in a cross section in an axle direction, bead seats 51a and 51b at both ends in the vehicle width direction, rim flanges 51c and 51d each bend in an L shape outward respectively from the bead seats 51a and 51b, and a well 51e recessed inward from the bead seats. The tire 9 is assembled on the bead seats 51a and 51b, and the rim flanges 51c and 51d prevent the tire 9 from being removed outward. The well 51e is provided to allow beads of the tire 9 to drop when the tire 9 is to be assembled.

The disc 52 is provided to couple the wheel 5 to the hub 72 on the axle 71, and is integrally formed inside the rim 51. The disc 52 has a disc shape provided with a hub attaching hole 52a at its center, and, on a face facing inward of the vehicle, a first attaching face 52b to which the hub 72 is to be attached is formed. The first attaching face 52b is offset outward in the vehicle width direction from a center line C1 in the vehicle width direction of the wheel 5. S1 in FIG. 7 is indicative of an amount of offset of the first attaching face 52b.

When the hub 72 is attached to the first attaching face 52b (first attached state), the first attaching face 52b lies outside in the vehicle width direction with respect to the center line C1 of the wheel 5, i.e., is positive offset. At this time, an outer end 5a in the vehicle width direction of the wheel 5 lies inside in the vehicle width direction with respect to the vehicle body frame 1 when viewed in the longitudinal direction, and the distance D1 between the outer ends in the vehicle width direction of the front wheel 21 accordingly becomes shorter than the vehicle width. At this time, the vehicle width is defined by a distance D11 between the outer ends in the vehicle width direction of the vehicle body frame 1. The tread width is defined to D21. The first attaching face 52b may be used for attachment to the hub 72 via a first spacer 53.

Figure 8:
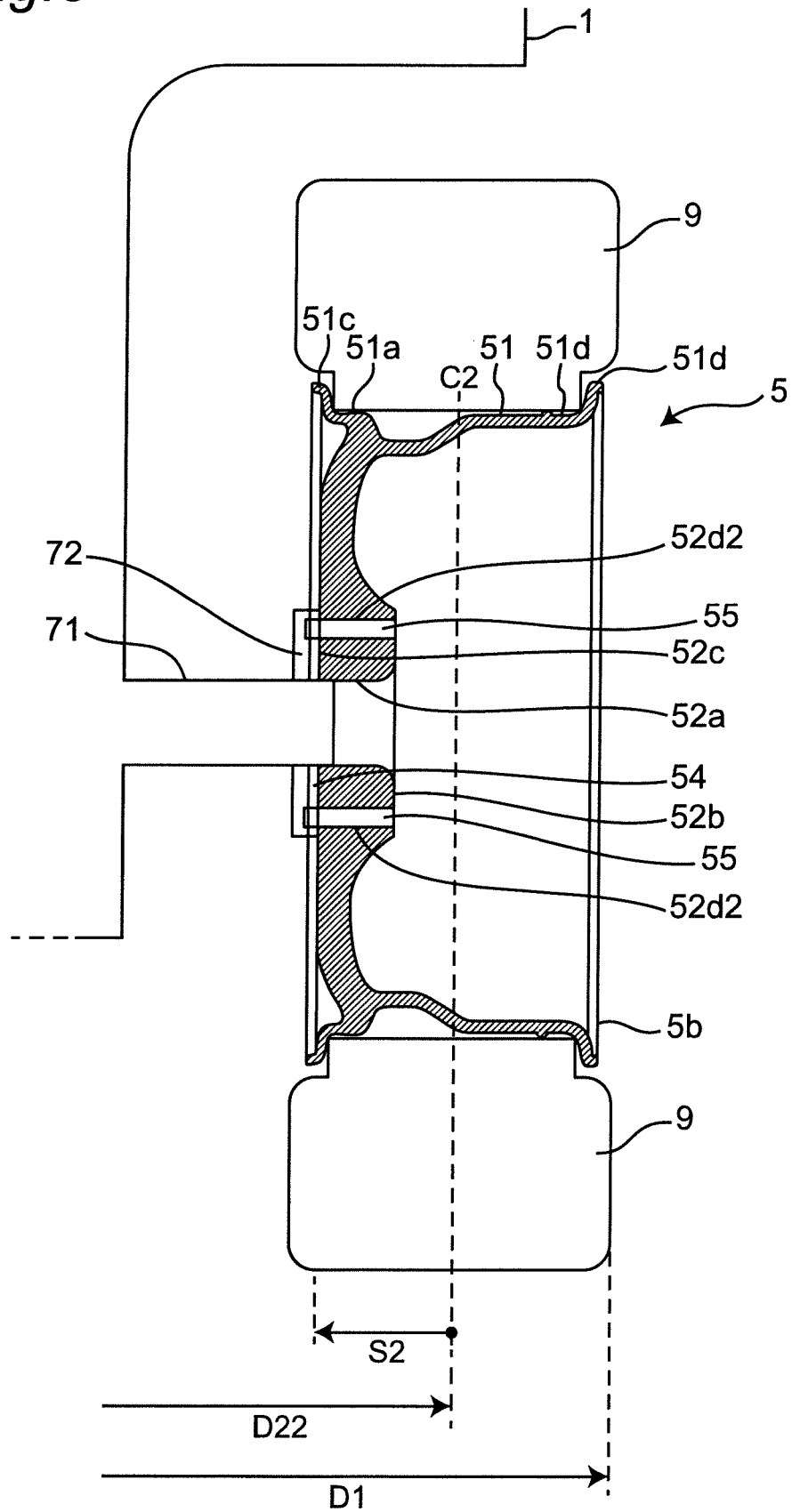
FIG. 8 is a schematic front view when the hub on the axle is attached to a second attaching face of the wheel.

FIG. 8 is a front schematic view when the hub 72 on the axle 71 is attached to the second attaching face 52c of the wheel 5 (second attached state). As shown in FIG. 8, in the second attached state, the wheel 5 inversed in the vehicle width direction from the first attached state is attached to the hub, and, when the hub 72 is attached to the second attaching face 52c, the second attaching face 52c lies inside in the vehicle width direction with respect to a center line C2 in the vehicle width direction of the wheel 5, i.e., is negative offset. S2 in FIG. 8 is indicative of an amount of negative offset of the second attaching face 52c. At this time, an outer end 5b in the vehicle width direction of the wheel 5 lies outside in the vehicle width direction with respect to the vehicle body frame 1 when viewed in the longitudinal direction, and the distance D1 between the outer ends in the vehicle width direction of the front wheels 21 accordingly becomes greater than the vehicle width. The vehicle width is thus defined by the distance D1 between the outer ends in the vehicle width direction of the front wheels 21, instead of the distance D11 between the outer ends in the vehicle width direction of the vehicle body frame 1. The tread width is defined to D22. FIG. 4 shows the state shown in FIG. 8, i.e., the hub 72 on the axle 71 is attached to the second attaching face 52c of the wheel 5. Similar to the first attaching face 52b, the second attaching face 52c may be used for attachment to the hub 72 via a second spacer 54.

The tread width D22 when the hub 72 is attached to the second attaching face 52c (FIG. 8) is therefore greater than the tread width D21 when the hub 72 is attached to the first attaching face 52b. The vehicle width of the utility vehicle 10 is defined by the outer ends in the vehicle width direction of the vehicle body frame 1 in the state shown in FIG. 7, while, in the state shown in FIG. 8, the vehicle width is defined by the outer ends in the vehicle width direction of the wheels 5.

Figure 9:
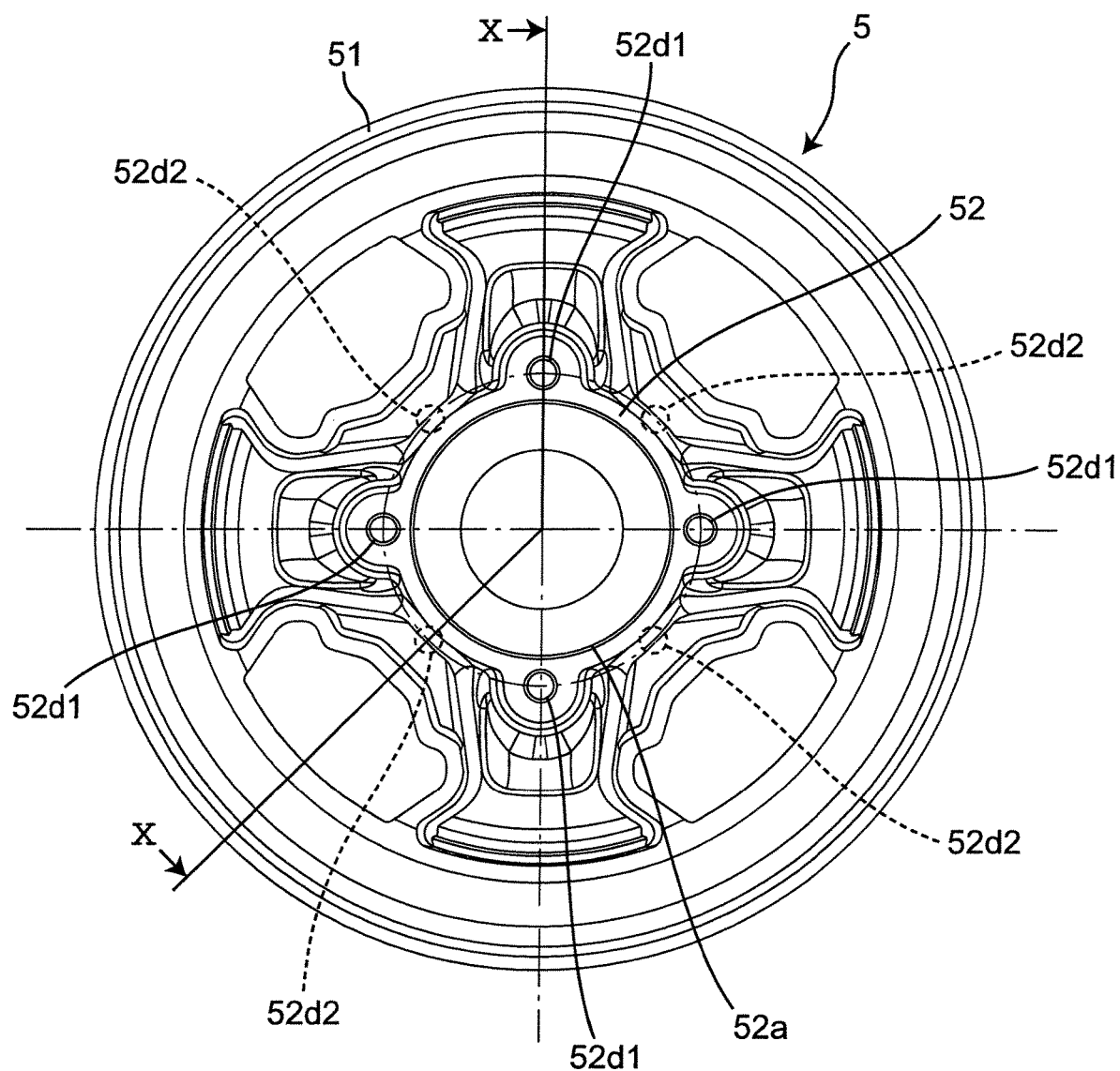
FIG. 9 is a schematic side view of the wheel.
Figure 10:
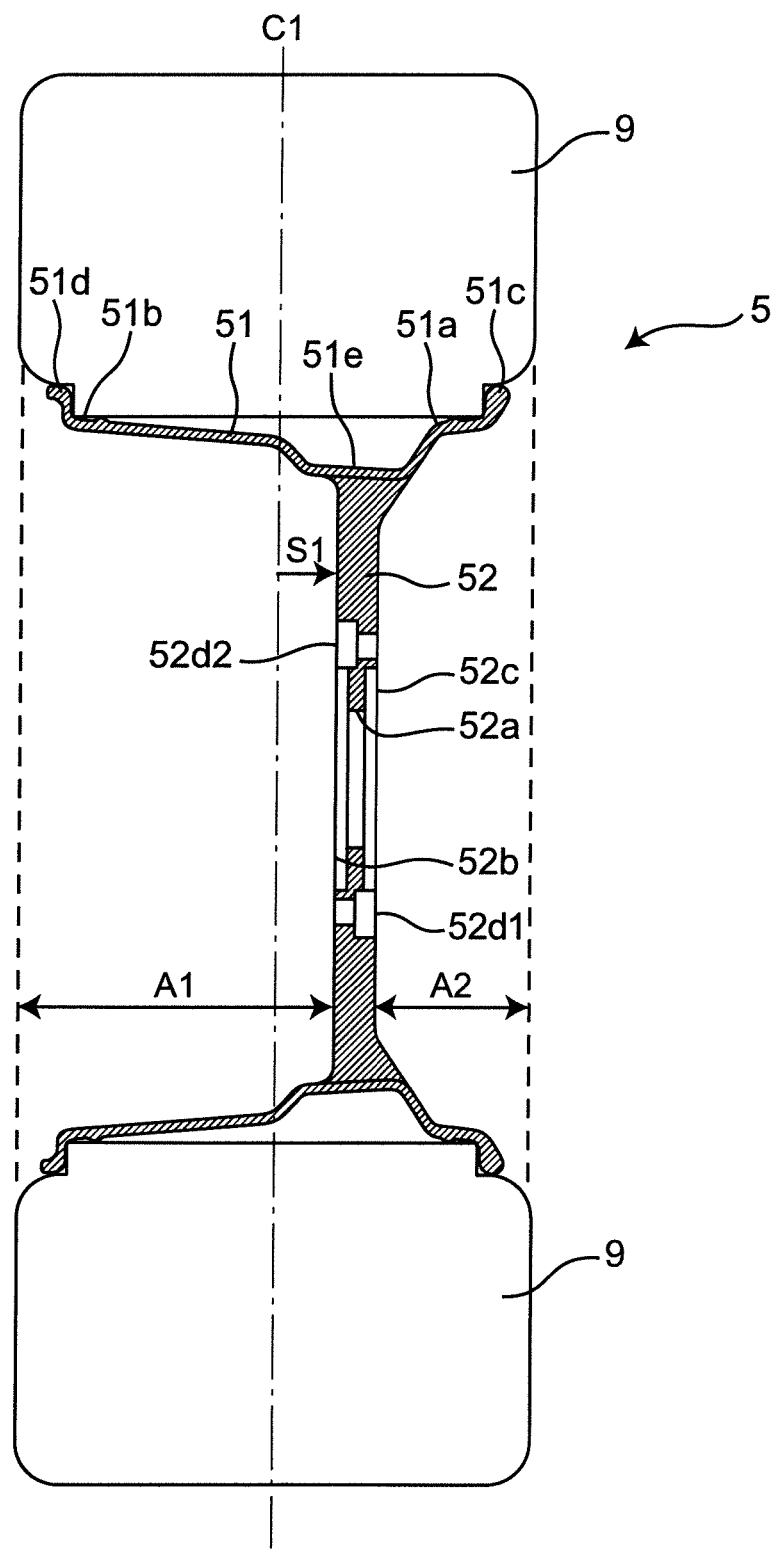
FIG. 10 is a cross-sectional view taken along the line X-X shown in FIG. 9.

FIG. 9 is a schematic side view of the wheel 5, and FIG. 10 is a cross-sectional view taken along the line X-X shown in FIG. 9. As shown in FIG. 9, around the outer periphery of the hub attaching hole 52a, attaching bolt holes 52d1 and 52d2 into which attaching bolts 55 are to be inserted are provided. The attaching bolt holes 52d1 and 52d2 respectively have first holes 52d1 into which the attaching bolts 55 insert when the hub 72 is attached to the first attaching face 52b, and second holes 52d2 into which the attaching bolts 55 insert when the hub 72 is attached to the second attaching face 52c. The first holes 52d1 and the second holes 52d2 are identical in number, and are alternately and evenly provided in a peripheral direction. When the hub 72 is attached to the first attaching face 52b or the second attaching face 52c, the first holes 52d1 and the second holes 52d2 are not shared. In the embodiment, the four first holes and the four second holes are provided.

A distance A1 between an end face of the wheel and the first attaching face 52b is greater than a distance A2 between another end face of the wheel and the second attaching face 52c, and it is advantageous, for example, that the distance A1 is greater than the distance A2 by four inches (10.16 cm).

According to the wheel structured to have the configuration, the following advantageous effects can be acquired.

(1) With a single type of the wheel 5 including the two attaching faces (first attaching face 52b and second attaching face 52c), a tread width (total width) of a vehicle can be changed with a plurality of the wheels 5 by respectively changing one of the attaching faces used for attachment to each of the hubs 72 to another. As a result, a tread width of the vehicle can be increased so that the vehicle can stably travel muddy, sand dune, and other soft areas, while the tread width of the vehicle can be reduced so that the vehicle can easily avoid obstructions in mountain, forest, and other narrower roads.

(2) Conventionally, a tread width was changed by preparing and using two types of wheels, i.e., wheels for making a tread width of 64 inches and wheels for making a tread width of 72 inches. However, as shown in FIG. 10, by preparing the wheels 5 for making a tread width of 64 inches when the hubs 72 are respectively attached to the first attaching faces 52b for positive offsetting, a difference between the distance A1 and the distance A2 reaches four inches, achieving a tread width of 72 inches when the hubs 72 are respectively attached to the second attaching faces 52c for negative offsetting. In other words, by changing one of the attaching faces used for attachment to each of the hubs 72 to another, e.g., between the first attaching faces 52b and the second attaching faces 52c, two tread widths (64 inches and 72 inches) can be achieved with a single type of the wheel 5.

(3) When the hubs 72 are respectively attached to the first attaching faces 52b or the second attaching faces 52c via the spacers 53 or 54, tread widths can be finely adjusted with the spacers 53 or 54.

(4) In the first attached state in which the first attaching face 52b is used for attachment, the outer end in the vehicle width direction of the wheel 5 lies inside in the vehicle width direction of the vehicle body frame 1 when viewed in the longitudinal direction, and, in the second attached state in which the second attaching face 52c is used for attachment, the outer end in the vehicle width direction of the wheel 5 lies outside in the vehicle width direction with respect to the outer end in the vehicle width direction of the vehicle body frame 1 when viewed in the longitudinal direction. As a result, by changing one of the attaching faces used for attachment to the hub 72 to another, a vehicle width of a vehicle can be changed with a single type of the wheel 5.

(5) Since the first holes 52d1 formed on the first attaching face 52b and the second holes 52d2 formed on the second attaching face 52c do not align to each other, the first attaching face 52b and the second attaching face 52c are prevented from being confused, and accordingly the wheel 5 is prevented from being attached incorrectly.

(6) When the hubs 72 are respectively attached to the second attaching faces 52c, the vehicle widths of the utility vehicle 10, which are defined by the distance D1 between the outer ends in the vehicle width direction of the front wheels 21 and the distance D3 between the outer ends in the vehicle width direction of the rear wheels 22, can be changed in addition to the tread widths by changing one of the attaching faces of the wheel 5, which are used for attachment to the hubs 72, to another.

Although, in the above described embodiment, the tread width D2 between the front wheels 21 and the tread width D4 between the rear wheels 22 are identical to each other, the tread widths may differ from each other. When the tread width between the front wheels and the tread width between the rear wheels differ from each other, it is advantageous that the tread width between the rear wheels be greater than the tread width of the front wheels.

Although, in the above described embodiment, the vehicle width (total width) of the utility vehicle 10 in the second attached state is defined by the distance D1 between the outer ends in the vehicle width direction of the front wheels 21 and the distance D3 between the outer ends in the vehicle width direction of the rear wheels 22, the distance between the outer ends in the vehicle width direction of the vehicle body frame 1 may be greater than the distance between the outer ends in the vehicle width direction of the wheels, and accordingly the vehicle width may be defined by the distance between the outer ends in the vehicle width direction of the vehicle body frame 1.

Although, in the above described embodiment, the first holes 52d1 and the second holes 52d2 are formed so as not to align to each other, the holes may align to each other. When the first holes 52d1 and the second holes 52d2 are formed to align to each other, the number of holes into which the attaching bolts 55 insert can be reduced in half, reducing the areas of openings provided on the disc 52 of the wheel 5. As a result, the disc 52 can be improved in strength.

The various modifications and alterations are also conceivable without departing from the spirit and scope of the present invention described in claims.

What is claimed is:

1. A wheel for a utility vehicle, comprising:
   a first attaching face configured to attach the wheel to a hub of a vehicle body;
   a second attaching face configured to attach the wheel inversed in a vehicle width direction to the hub;
   a first spacer configured to attach the first attaching face to the hub; and
   a second spacer configured to attach the second attaching face to the hub,
   wherein the first attaching face is, when attached to the hub, offset outward in the vehicle width direction with respect to a center line in the vehicle width direction of the wheel,
   wherein the second attaching face is, when attached to the hub, offset inward in the vehicle width direction with respect to the center line in the vehicle width direction of the wheel.

2. The wheel according to claim 1, wherein
   in a first attached state in which the first attaching face attaches the wheel to the hub, an outer end in the vehicle width direction of the wheel lies inside in the vehicle width direction with respect to an outer end in the vehicle width direction of a frame of the vehicle body when viewed in a longitudinal direction, and
   in a second attached state in which the second attaching face attaches the wheel to the hub, the outer end in the vehicle width direction of the wheel lies outside in the vehicle width direction with respect to the outer end in the vehicle width direction of the frame of the vehicle body when viewed in the longitudinal direction.

3. A wheel for a utility vehicle, comprising:
   a first attaching face configured to attach the wheel to a hub of a vehicle body;
   a second attaching face configured to attach the wheel inversed in a vehicle width direction to the hub,
   wherein the first attaching face is, when attached to the hub, offset outward in the vehicle width direction with respect to a center line in the vehicle width direction of the wheel,
   wherein the second attaching face is, when attached to the hub, offset inward in the vehicle width direction with respect to the center line in the vehicle width direction of the wheel, and
   wherein first hub bolt attaching holes formed on the first attaching face and second hub bolt attaching holes formed on the second attaching face do not respectively align with each other.

4. The wheel according to claim 3, wherein:
   in a first attached state in which the first attaching face attaches the wheel to the hub, an outer end in the vehicle width direction of the wheel lies inside in the vehicle width direction with respect to an outer end in the vehicle width direction of a frame of the vehicle body when viewed in a longitudinal direction, and
   in a second attached state in which the second attaching face attaches the wheel to the hub, the outer end in the vehicle width direction of the wheel lies outside in the vehicle width direction with respect to the outer end in the vehicle width direction of the frame of the vehicle body when viewed in the longitudinal direction.

* * * * *